United States Patent [19]
Zylstra et al.

[11] Patent Number: 4,910,443
[45] Date of Patent: Mar. 20, 1990

[54] ELECTRONIC CONTROL CIRCUIT FOR A BIDIRECTIONAL MOTOR

[75] Inventors: Henry J. Zylstra, Alburnett; Ronald J. Etscheidt, Anamosa, both of Iowa

[73] Assignee: Square D Company, Palatine, Ill.

[21] Appl. No.: 317,268

[22] Filed: Feb. 28, 1989

[51] Int. Cl.[4] .............................................. H02P 1/22
[52] U.S. Cl. .................................... 318/294; 318/266; 318/285; 318/286; 318/293
[58] Field of Search ............... 318/244, 245, 246, 249, 318/250, 251, 252, 253, 291, 293, 294, 264, 265, 266, 285, 286

[56] References Cited

U.S. PATENT DOCUMENTS

| | | | |
|---|---|---|---|
| 4,181,875 | 1/1980 | Kohzai et al. ........................ | 318/252 |
| 4,309,644 | 1/1982 | Reimers et al. ................. | 318/251 X |
| 4,329,630 | 5/1982 | Park ................................. | 318/293 X |
| 4,447,768 | 5/1984 | Terui ................................ | 318/293 |
| 4,514,666 | 4/1985 | Suzuki ............................. | 318/293 |
| 4,544,869 | 10/1985 | Pittaway ......................... | 318/293 |
| 4,639,647 | 1/1987 | Posma ........................... | 318/246 X |
| 4,677,356 | 6/1987 | Tsuneda et al. ................ | 318/293 X |
| 4,774,443 | 9/1988 | Herzig ............................ | 318/293 |

*Primary Examiner*—Bentsu Ro
*Attorney, Agent, or Firm*—Jose W. Jimenez

[57] ABSTRACT

A field installable motor operator for a circuit breaker includes a bidirectionally controllable motor that is coupled through a torque limited module to a circuit breaker operating mechanism. The motor is bidirectionally driven by a transistor switching bridge that supplies output current in reversible flow directions through one of the windings of the motor to the input of a rectifier bridge that supplies the other winding with currents that flow in the same direction. The torque limited module includes a centering and spacing ring which precisely confines the clutch elements to provide consistent torque. The motor is supplied with a current pulse of 250 milliseconds duration that is longer than the time required to fully operate the breaker. The clutch slips when breaker operation is completed and permits the motor to overrun without damage.

4 Claims, 5 Drawing Sheets

ELECTRONIC CONTROL CIRCUIT FOR A BIDIRECTIONAL MOTOR

CROSS REFERENCE TO RELATED APPLICATIONS

This application discloses apparatus claimed in co-pending applications Ser. No. 317,269, filed 2/28/89, entitled Clutch Module with Predetermined Torque in the names of R. Etscheidt and D. Ophaug, and Ser. No. 316,849, filed 2/28/89 entitled Field installable Electrical Operator For A Circuit Breaker in the names of R. Etscheidt, D. Ophaug and H. Zylstra, all of which are assigned to Square D Company.

BACKGROUND OF THE INVENTION AND THE PRIOR ART

This invention relates generally to motorized operators for circuit breakers used on electrical power systems and the like and specifically to electrical operators for such mechanically operated circuit breakers that may be readily installed on site, i.e. in the field.

One of the principal advantages of having the capability of electrically opening and closing circuit breakers is the ability to remotely operate the breaker in response to operator control as well as in response to fault currents. With electrically controlled motorized systems for opening and closing the circuit breakers, load switching and branch circuit protection may be rapidly and effectively accomplished because of the elimination of the need for a technician to physically manipulate the operating mechanism of the circuit breaker.

In many instances, it is desirable to upgrade a mechanically operated breaker by installing a motor control system therefor. Most of the motor control systems include mechanical electric switches to run the bidirectional motor in addition to limit switches for stopping the motor when the breaker reaches an operating position, i.e. either fully opened or fully closed. It is desirable to open or close a breaker rapidly and the limit switches, especially, are difficult and awkward to adjust in the field, and may be adjusted improperly.

As alluded to above, it is desirable that the circuit breaker operate to open or close all electrical phases as rapidly as possible and within a minimum time period for all phases. The motor drive must therefore rapidly start the motor, deliver very high torque for approximately 105 degrees of angular rotation, and rapidly stop. These severe requirements have necessitated the use of expensive apparatus that requires careful adjustment.

The present invention is directed to a novel electronic control system for a bidirectional high torque motor that operates a multiphase circuit breaker through a single reduction gear and a torque limited module. Bidirectional control is achieved by connecting one winding of the motor to the output of a rectifier bridge and connecting the other winding motor in series with the output of the rectifier bridge. The combination is connected in the output of a switching bridge that is controlled by appropriate control signals. The current through the winding connected in series with the rectifier bridge always flows in the same direction, whereas the direction of current flow in the winding coupled to the switching bridge reverses with the different control signals. FET driven transistor switches are used in the switching bridge. A dual monostable timer delivers a timed or predetermined duration of motor drive current, irrespective of the control signal duration and the torque limited module slips to permit the motor to over-run the breaker operation. The motor run time is sufficient to insure that the breaker has been fully operated, that is opened or closed. The torque limited module and the field installable electrical operator are individually the subjects of the above mentioned copending applications since they have separate utility apart from the present invention.

OBJECTS OF THE INVENTION

A principal object of the invention is to provide a novel electronic control circuit for a motor.

Another object of the invention is to provide a novel bidirectional motor switching circuit.

BRIEF DESCRIPTION OF THE DRAWINGS

These and other objects and advantages of the invention will be apparent upon reading the following description in conjunction with the drawings in which.

DESCRIPTION OF THE PREFERRED EMBODIMENT

Figure 1:
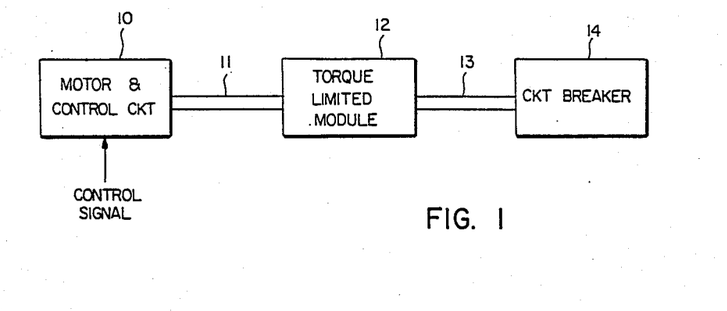
FIG. 1 is a simplified block diagram of an electrical operator constructed in accordance with the invention.

In FIG. 1 a block 10, labelled Motor and Control Circuit is supplied with a control signal, resulting in rotation of a motor shaft 11 that is coupled to a block 12, labelled Torque Limited Module. The torque limited module 12 has an output drive shaft 13 that is coupled to a block 14, labelled Circuit Breaker, for angularly rotating the operating mechanism arms of the circuit breaker through a limited angle for opening (or closing) electrical circuits completed therethrough.

Figure 2:
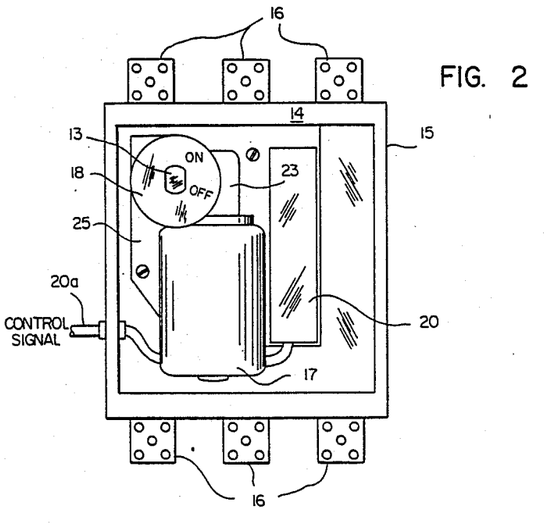
FIG. 2 is a plan view of a circuit breaker having the electrical operator of the invention installed thereon.

In FIG. 2 a plan view of circuit breaker 14 is illustrated with its protective door removed to show the electrical operator in position. A housing 15 encloses the circuit breaker elements. Six electrical lugs 16 protrude from the top and the bottom of the housing 15 and are adapted for connection to appropriate circuits (not shown). The end of drive shaft 13 is seen to have opposed flat sides giving it a familiar double D shaped cross section. A motor 17 is coupled to a module housing 23 which includes a torque limited module that rotates drive shaft 13. An indicating disc 18 is mounted in a fixed position to the end of drive shaft 13 to indicate the operated condition of the breaker, i.e. whether it is ON or OFF. A mounting plate 25 is provided for securing motor 17 and module housing 23 in proper position on breaker 14. An elongated box 20, mounted on housing plate 25 adjacent to motor 17, includes electronic control circuitry for controlling operation of motor 17 based upon appropriate open and close control signals which are applied through the indicated cabling at 20a. It will be appreciated that the electrical operator breaker door or cover, which is not illustrated and, which encloses mounting plate 25 includes a suitable viewing aperture so that the legend ON or OFF is visible therethrough to indicate the operational position of the circuit breaker, i.e. whether ON or OFF. A push button ON/OFF switch may also be mounted on the mounting plate 25 or on housing 15 to enable a technician to operate the circuit breaker at the premises. As will be seen, the shaft of motor 17 may be mechanically turned by a screw driver or other similar tool to "manually" operate the circuit breaker through the reduction gearing. Naturally, a number of revolutions of the motor armature are required to operate the breaker. While not illustrated, the breaker operating mechanism includes a handle that is removed when installing a motorized operator. A suitable adapter is placed on the end of the breaker operating shaft, which is engaged by the drive shaft of the electrical operator mechanism, as will be seen. The illustration is for a breaker with a front mounted rotatable operating handle, but the suitable modifications the system is readily adaptable for use with side mounted breaker handles.

Figure 3:
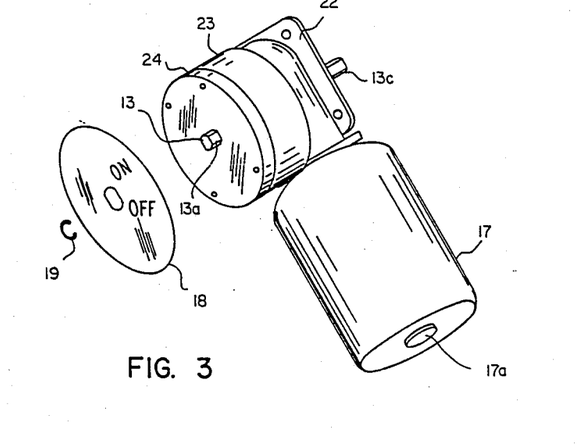
FIG. 3 is a perspective view of the motor, torque limited module housing and indicator plate.

In FIG. 3 the motor 17, module housing 23 and indicator plate 18 are shown in perspective. The base of the motor includes an access opening 17a in which a screw driver may be inserted for engaging a slot in the end of the motor armature shaft (not shown) to permit rotation of the motor armature shaft to operate the breaker in the event of a failure in the electrical control system. A mounting base 22 serves to affix motor 17 and module housing 23 to mounting plate 25 by the use of suitable fasteners. A removable module housing cover 24 enables access to the torque limited module and clutch elements (and gears) enclosed in module housing 23. The flat portions 13a on the indicator plate end of drive shaft 13 engage a similarly shaped aperture in indicator plate 18. A circular spring clip 19 in a groove on the end of shaft 13 secures indicator plate 18 in position on the end of drive shaft 13. Any other suitable fastener arrangement may be used, however. The breaker operating end of drive shaft 13 with flat portions 13c is also visible.

Figure 4:
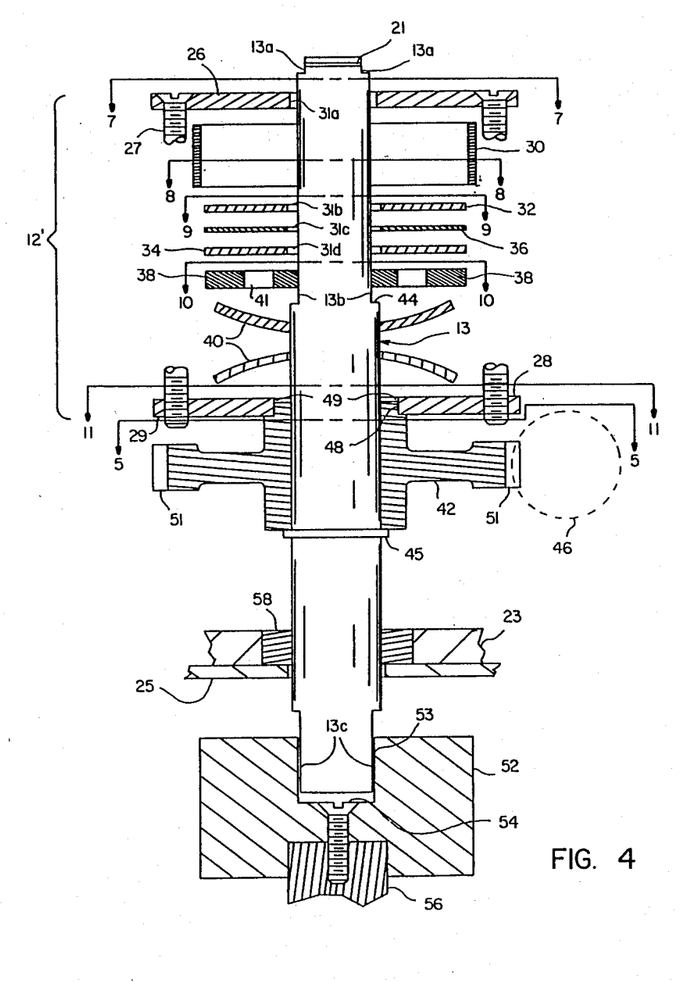
FIG. 4 is an enlarged exploded view of the clutch elements and the torque limited module.
Figure 5:
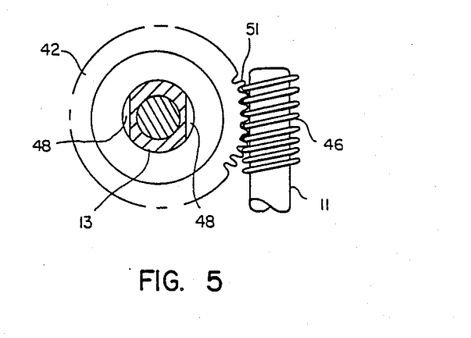
FIG. 5 is a reduced partial view, taken along the line 5—5 of FIG. 4, illustrating the drive arrangement between the motor and the torque limited module and the clutch mechanism.
Figure 6:
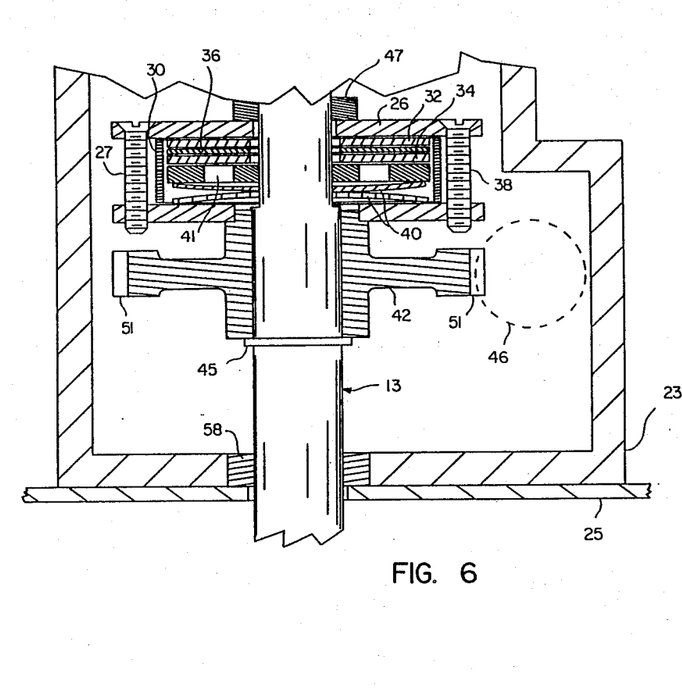
FIG. 6 is a partial view showing the assembled torque limited module and clutch elements.
Figure 7:
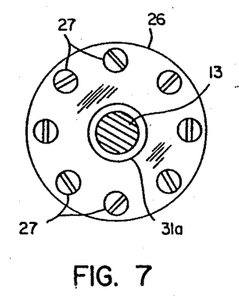
FIGS. 7 through 11 are reduced sectional views taken along the lines 7 through 11, respectively, of FIG. 4.

FIGS. 4, 5 and 6 show the various portions of the torque limited clutch module 12, and the clutch elements. Referring specifically to FIG. 4, drive shaft 13 is seen to have flat portions 13a, 13b and 13c forming double D cross sections. An annular groove 21 in the end of drive shaft 13 adjacent flat portions 13a, cooperates with the clip 19 (FIG. 3) for retaining indicator plate 18 in position. It will be appreciated that a top bearing and supporting element for positioning drive shaft 13 in the module housing cover 24 is omitted for clarity in FIG. 4.

The clutch elements and the torque limited module, shown in exploded view, are enclosed within the bracket 12'. The torque limited module 12 is bounded by an upper module plate 26 and a lower module plate 28. The module plates are secured by a plurality of circularly disposed screws 27 which pass through appropriate holes in upper module plate 26 and into threaded apertures 29 in lower module plate 28. An annular centering and spacing ring or cylinder 30 is disposed adjacent the underside of upper module plate 26. The clutch elements comprise a pair of annular friction discs 32 and 34 which are separated by a thin annular spacer disc 36 and a clutch drive plate 38. It will be noted that the upper module plate 26, friction disc 32, spacer disc 36 and friction disc 34 have central openings 31a, 31b, 31c and 31d respectively, of larger diameter than the diameter of the portion of drive shaft 13 in the area of flat portions 13b above a shoulder 44. Clutch drive plate 38, differs however, and has a double D shaped opening that matches the cross section of drive shaft 13 at flat portions 13b, which locks the clutch drive plate 38 to drive shaft 13. The clutch drive plate 38 therefore rotates with drive shaft 13. A pair Belleville of springs or washers 40 complete the torque limited module. Lower module plate 28 has a larger double D shaped opening with flat sides 49 that engage a similarly shaped shoulder 48 formed at one end of a drive gear 42. Drive gear 42 is freely rotatable on drive shaft 13. As indicated by the dashed line circle, a pinion bear 46 on the end of motor shaft 11 engages the gear teeth 51 about the periphery of drive gear 42.

As best seen in FIG. 5, motor shaft 11 has its end terminating in pinion gear 46 that engages teeth 51 about the circumference of drive gear 42. A suitable bearing support 45 supports drive gear 42 at the end of drive shaft 13 adjacent to the circuit breaker. The torque limited module 12 and other supporting structure (not shown), engaging shaft 13, keep drive gear 42 in contact with bearing support 45. The flat side portions 13c at the lower end of drive shaft 13 present a double D shaped cross section fits into a breaker adapter 52, generally indicated by a rectangle. Breaker adapter 52 has a suitable mating recess 53 for driving engagement with the lower end of drive shaft 13 (at 13c). A screw or other suitable fastener 54 affixes breaker adapter 52 to the end of breaker operating mechanism 56. As mentioned, when the motorized operator is to be used, the circuit breaker operating handle is removed and adapter 52 is installed in its place. The configuration of the various parts depends upon the shape and arrangement of the breaker operating mechanism and the breaker housing and consequently only a block diagram representation of such parts is included. As indicated, the drive shaft 13 protrudes through an orifice in mounting plate 25 to permit driving engagement with breaker adapter 52. A bearing member 58 rotatably supports drive shaft 13 where it extends through module housing 23.

FIG. 6 illustrates the assembled torque limited module and clutch wherein the various elements are squeezed together between the upper and lower module plates, by virtue of the spring force of Belleville washers 40 and tightening of screws 27, to fit wholly within the confines of centering ring or cylinder 30. The upper portion of drive shaft 13 passes through another bearing 47 and the top of module housing cover 24. Centering ring 30 serves as a stop for the upper and lower module plates 26 and 28, respectively. During assembly of the torque limited module, screws 27 are drawn up tight thus forcing all of the elements within the confines of cylinder 30. As a result, cylinder 30 not only serves to maintain the various clutch elements in alignment, it establishes a consistent torque load for the clutch and which may be conveniently assembled at a remote location until ready for installation. Hence the name torque limited module.

Figure 8:
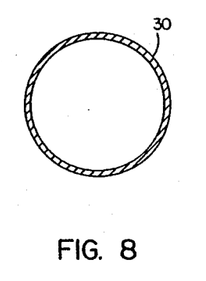
Figure 9:
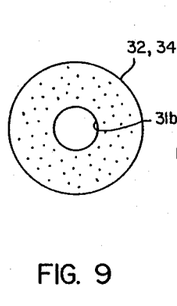
Figure 10:
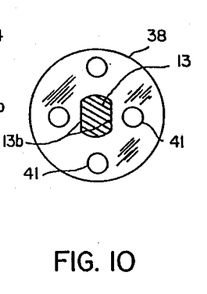
Figure 11:
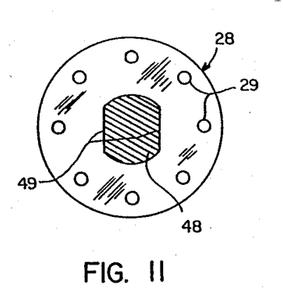

As shown in FIGS. 7 through 11, the upper module plate 26 includes a central hole 31a of larger diameter than the diameter of the upper portion of drive shaft 13. Also shown are screws 27 circumferentially disposed about the upper module plate to facilitate securing the elements of the assembly. The top view of the centering ring 30 in FIG. 8 shows its cylindrical construction. The friction discs 32 and 34 of FIG. 9 have a slightly smaller outer diameter than the inner diameter of cylinder 30 and have a central hole 31b having an inner diameter that enables the drive shaft 13 to freely pass therein. The spacer disc 36 is not illustrated but has the same shape as the friction discs 32 and 34. The purpose of the spacer disc is to double the clutch's frictional surface to provide improved loading effect. The clutch drive plate 38 in FIG. 10 includes a plurality of optional spaced holes 41 for aiding in distribution of grease between the various clutch elements and collection of eroded friction disc material. It also has a double D shaped cutout having flat portions which engage the flat sides 13b of drive shaft 13. Therefore the clutch drive plate 38 is rotatable with drive shaft 13 at all times. The lower module plate 28 shown in FIG. 11 includes a larger double D shaped cross section having a pair of flat sides 49 for cooperative engagement with a similarly shaped shoulder 48 on gear wheel 42. A plurality of threaded holes 29 receive screws 27 for securing the torque limited module assembly together.

Operation of the torque limited module is straightforward. All of the clutch elements, with the exception of drive plate 38, are freely movable on drive shaft 13. By virtue of the force imposed by Belleville springs 40 on the clutch elements (which are captivated between the upper and lower module plates) frictional drive forces are developed between: the under side of upper module plate 26 and the upper side of friction disc 32; the under side of friction disc 32 and the upper side of spacer disc 36; the under side of spacer disc 36 and the upper side of friction disc 34; and the under side of friction disc 34 and the upper side of clutch drive plate 38. The interior of module housing 23 is filled with a suitable grease for lubrication and heat dissipation purposes and the friction discs and Belleville springs are selected to develop approximately 55 lb-ft of torque. For loadings beyond that, the friction elements slip and rotation of gear wheel 42 (by pinion gear 46) does not result in rotation of drive shaft 13. For loads less than that for which the torque limited module is made to slip, rotation of gear wheel 42 causes rotation of drive plate 38 and drive shaft 13. When the circuit breaker operating mechanism reaches its fully open or fully closed position, the load imposed on drive shaft 13 becomes greater than the slip force for the torque limited module and the clutch slips to permit the motor to overrun without causing damage.

Figure 12:
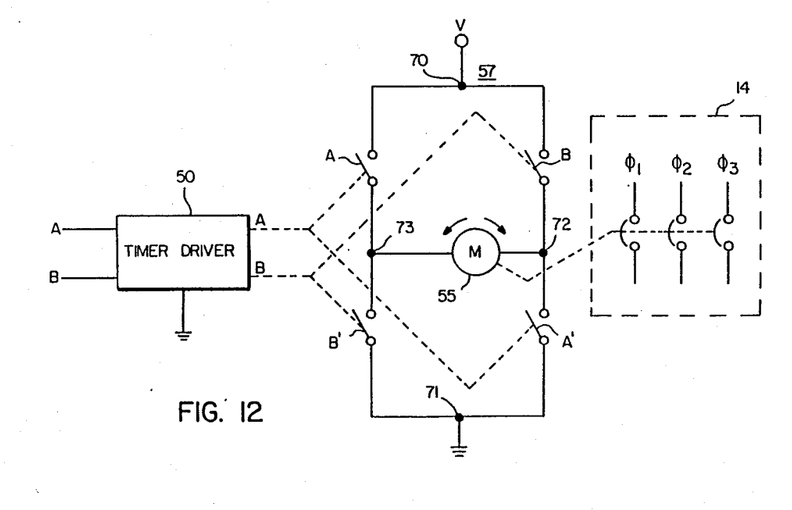
FIG. 12 is a simplified illustration of the bidirectional motor supply system.

FIG. 12 illustrates general operation of the motor controlled circuit breaker system. A timer driver block 50 having control signal inputs A and B (A representing clockwise motor rotation and B representing counter clockwise rotation), selectively operates two pairs of switches in a switching bridge 57 for providing oppositely directed currents to a motor 55 for causing bidirectional rotation as indicated by the arrows. Motor 55 is coupled to the individual electrical phase connectors in three-phase circuit breaker 14. The switch bridge 57 terminals are arbitrarily marked 70, 71 and 72, 73 to indicate input terminals and output terminals, respectively. In accordance with the invention, a predetermined duration drive current or drive pulse is supplied to motor 55. The energy supplied is sufficient to assure complete opening (or closing) of the mechanical elements in circuit breaker 14, with the torque limited module accommodating motor overrun.

Figure 13:
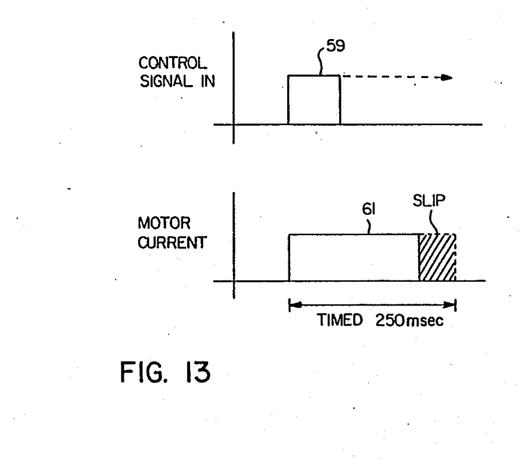
FIG. 13 illustrates the relationship between the control signal and the timed motor current.

As indicated in FIG. 13, an input control signal may comprise a pulse 59 of limited duration. The dashed line trailing the end of pulse 59 indicates that the pulse may have a longer duration. Indeed, in the preferred implementation, the input signal may be continuous AC or DC. The motor current that flows in response to the input control signal is a fixed quantity 61, indicated by the current 61 bearing the legend TIMED. The shaded portion near the end of 61 indicates the torque limited module slip time during which the motor continues to run after the breaker has been fully operated.

Figure 14:
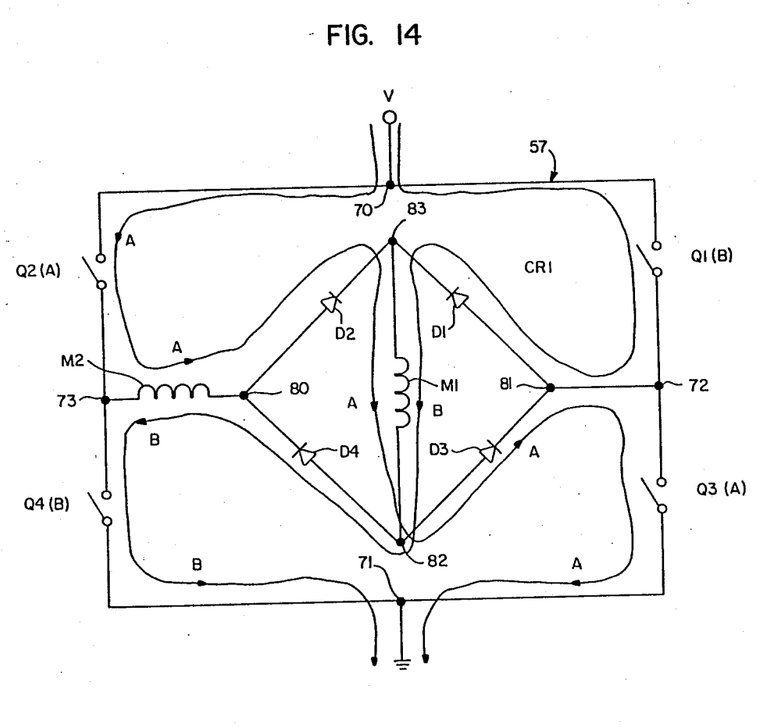
FIG. 14 is a more detailed diagram of the bidirectional motor supply system.

FIG. 14 shows an enlarged view of a double bridge arrangement for bidirectionally controlling the motor. The motor has two separate windings, M1 and M2 which may comprise conventional armature and field windings. The switching bridge input terminals 70 and 71 are connected between voltage V and ground. The arms of switching bridge 57 constitute two parallel paths of series-connected switches Q1, Q2, Q3 and Q4, with Q1 and Q4 being identified as the B or counterclockwise rotation switches, and Q2 and Q3 being identified as the A or clockwise rotation switches. The switches identified as Q1–Q4 correspond to the similarly identified transistors in FIG. 16. The M2 motor winding has one end connected to the output terminal 73 of the switching bridge 57, defined by the junction of Q2 and Q4, and its other end connected to an input terminal 80 of a rectifier bridge CR1, comprising four diodes D1–D4, the other input terminal 81 of which is connected to the output terminal 72 of the switching bridge 57. Output terminal 72 is defined by the junction of Q1 and Q3. The output terminals 82 and 83 for the rectifier bridge CR1 are connected to winding M1. As indicated, in response to closure of switches Q2 and Q3, an A current flows (as indicated by the arrow) from left to right through winding M2 and from top to bottom through winding M1. In response to closure of switches Q1 and Q4, a B current flows from top to bottom through winding M1, and from right to left through winding M2. As the duration of current flow in winding M2 is reversible, whereas the current in winding M1 always flows in the same direction, the motor will run in opposite directions, in response to closure of switches Q2 and Q3 and to closure of switches Q1 and Q4, respectively. An important feature of the control circuit is that no mechanical switches are required, with Q1–Q4 being the emitter-collector junctions of transistors. This operation contrasts with the prior art control circuits incorporating mechanical reversing switches and limit switches with consequent heavy contact wear and need for isolation due to the switched inductive motor currents.

Figure 15:
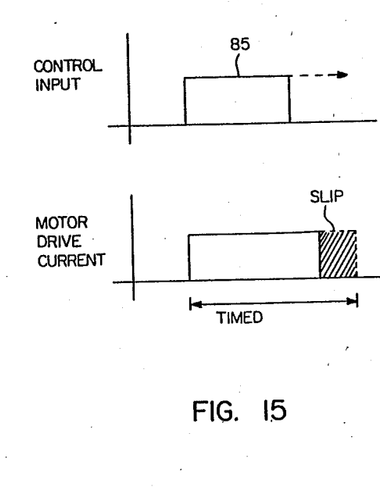
FIG. 15 illustrates the control signal input, opto coupler output and fixed duration motor drive current for the electronic motor control system.

In FIG. 15, the C curve indicates control input current based upon an ON or OFF control signal 85 and Curve D represents the timed motor drive current and the torque limited module slip operation as indicated previously.

Figure 16:
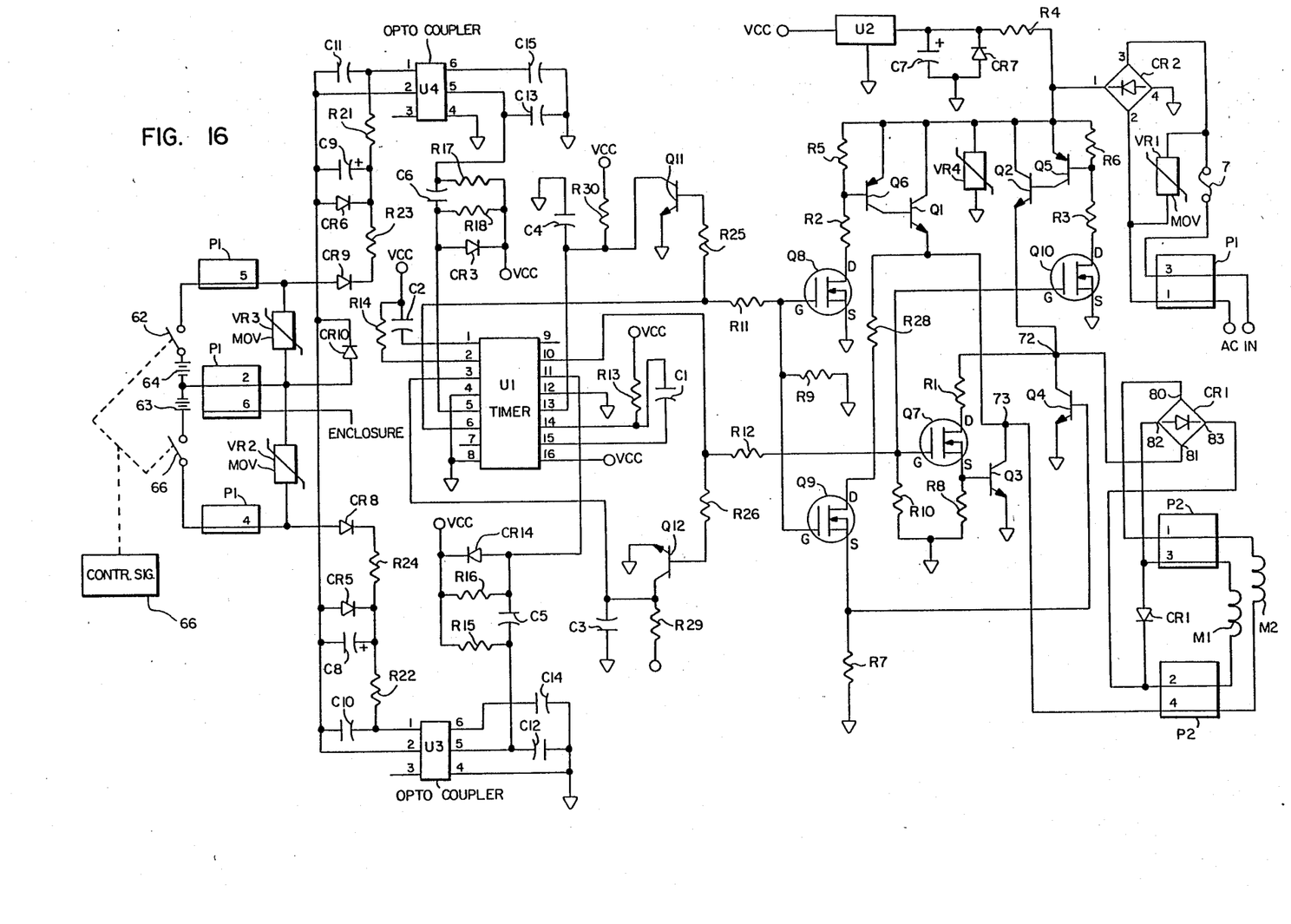
FIG. 16 is a detailed schematic diagram of the electronic motor control system.

Referring to the schematic diagram of FIG. 16, AC line power is applied to pins 1 and 3 of an input plug P1, through a fuse F, to pins 2 and 3 of a full wave bridge rectifier CR2. A MOV, identified as VR1, is coupled across the AC line and serves to limit the applied voltage. The output from pin 1 of rectifier CR2 is applied to a resistor R4 through an electrolytic capacitor C7 to ground. A zener diode CR7 is coupled across capacitor C7 and together these elements provide preregulation for a low voltage regulator U2, which supplies VCC potential. The rectified current from CR2 is coupled to junction 70 which is the input terminal of the switching bridge 57 discussed in FIGS. 12 and 14. The emitters of a pair of transistors Q5 and Q6 are connected to junction 70, as are the collectors of a pair of switch transistors Q1 and Q2. A pair of resistors R6 and R5 connect the emitters of transistors Q5 and Q6 to their respective bases. A MOV VR4 is connected from junction 70 to ground to further protect the circuitry from excessive voltage. The emitter of switch transistor Q2 is connected to the collector of a switch transistor Q4 whose emitter is connected to ground. The base of switch transistor Q4 is connected to ground through a resistor R7.

Resistor R5 is connected to a resistor R2 and their junction is connected to the base of transistor Q6. The collector of transistor Q6 is connected to the base of switch transistor Q1. The other end of R2 is connected to the drain (D) of an FET Q8 having a grounded source (S) electrode. The gate (G) of FET Q8 is connected to the gate of an FET Q9 and through a resistor R9 to ground. D of Q9 is connected through a resistor R28 to the emitter of switch transistor Q1 and to the collector of a switch transistor Q3 having a grounded emitter. S of Q9 is connected to R7. The base of transistor Q5 is connected to the junction of resistor R6 and a resistor R3, which is connected to D of FET Q10. S of Q10 is grounded. G of Q10 is connected to the gate of an FET Q7 and through a resistor R10 to ground. S of Q7 is connected to ground through a resistor R8 and to the base of switch transistor Q3. D of Q7 is connected through a resistor R1 to output terminal 72 of the switching bridge 57 and to input terminal 81 of the rectifier bridge CR1. Output terminals 82 and 83 of rectifier bridge CR1 are connected to the M1 motor winding, across which is coupled a diode CR11. The input terminal 80 of rectifier bridge CR1 is connected to the M2 winding of the motor which is returned to output terminal 73 of switching bridge 57. The above described circuitry corresponds to the illustration in FIG. 14, with the transistors Q1–Q4 being part of the switching bridge 57 and the diodes D1–D4 comprising the rectifier bridge CR1.

The gates of FETS Q8 and Q9 are coupled, through a resistor R11, to terminal 6 of a timer U1, and the gates of FETS Q7 and Q10 are coupled, through a resistor R12 to pin 10 of timer U1. U1 is a dual monostable timer available as part No. CD4098 from a number of electronics manufacturers. The pin numbers indicated correspond to those marked on the actual device. A pair of opto couplers, U3 and U4, identified as part Nos. 4N37 are used to provide isolation between the input signal circuitry and the control signal circuits. A capacitor C11 is connected across pins 1 and 2 of opto coupler U4, pin 4 is grounded and capacitors C13 and C15 connect pins 5 and 6 to ground, respectively. Pin 5 of U4 is also coupled to VCC through a resistor R17. VCC is applied through the parallel arrangement of a resistor R18 and a reverse connected diode CR3. A capacitor C6 couples pin 5 of U4 to pin 5 of U1.

The opposite input opto coupler U3 has its pin 6 connected to ground through a capacitor C14. Pin 5 is similarly connected to ground through a capacitor C12, and pin 4 is grounded. A capacitor C10 is coupled across pins 1 and 2. VCC is applied through R15 to pin 5 of U3 and through parallelly coupled R16 and reverse connected diode CR4 to pin 11 of U1. A capacitor C5 couples pin 5 of U4 to pin 11 of U1.

Pin 4 on an input plug P1 is connected through a diode CR8 and a series connection of resistor R24 and resistor R22 to pin 1 of U3. Similarly input pin 5 is connected through a diode CR9 and resistors R23 and R21 to pin 1 of U4. The junction of C11, C9 and CR6 is connected to the junction of C10, C8 and CR5 and to input pin 2 of plug P1 through a diode CR10. A pair of switches 61 and 62 are operated by a control signal block 60 to selectively connect pins 2 and 4, and pins 2 and 5 together through respective DC sources 63 and 64, indicated for simplicity as batteries. A pair of MOVs VR2 and VR3 protect the input pins from excessive voltages. The duration of the output currents from U1 is controlled by the combinations of capacitor C1 and resistors R13 and capacitor C2 and resistor R14, respectively, each of which is coupled to VCC. In the preferred embodiment of the invention, the pulse duration is established at 250 milliseconds, which is a time sufficient to insure complete breaker operation for the class of circuit breakers with which the electrical operator of the invention is used.

The timer U1 is precluded from responding to successive input control signals by virtue of transistors Q11 and Q12. Transistors Q11 and Q12 have their emitters connected to ground, and their collectors connected to VCC through resistors R30 and R29, respectively. R29 and R30 are bypassed to ground via capacitors C3 and C4 respectively. The collector of Q11 is connected to pin 13 of U1 and its base is connected through a resistor R25 to pin 6 of timer U1. The collector of Q12 is connected to pin 3 of U1 and its base is connected through a resistor R26 to pin 10 of U1.

In operation, closure of switch 61 or 62, in response to an appropriate control signal from control signal block 60, results in either pin 5 or pin 11 of timer U1 being brought to a low logic level. In response to pin 5 going low, an output pulse is produced at pin 6. Similarly, in response to pin 11 going low, an output pulse is produced at pin 10. The length of the output pulses, as mentioned, is determined by R14 and C2 for the pulse from pin 6 and by R13 and C1 for the pulse from pin 10. When switch 61 is closed, the motor will be driven in a clockwwise direction and when switch 62 is closed, the motor will be driven in a counter clockwise direction. The positive input signals, coupled via switches 61 and 62 to pins 4 and 5 respectively of connector P1, turn on transistors (not shown) in opto couplers U3 and U4 respectively. Currents to the opto coupler diodes are limited by resistors R21 and R23, for device U4, and by resistors R22 and R24 for device U3. The zener diodes CR5 and CR6 limit the input signal voltages and therefore the opto coupler currents. The capacitors C8 and C9 provide noise suppression and also provide sufficient storage to allow operation with either AC or DC control signals. A control signal saturates the opto coupler transistors, resulting in their collectors falling to near ground potential. This change in voltage level is coupled to pins 5 and 11, respectively of timer U1 to thereby initiate the drive pulses. It will be appreciated that only one of opto couplers U3 and U4 is saturated at any given time, depending on which of the input switches 61 or 62 is closed. The capacitors C5 and C6 immediately charge through respective resistors R16 and R18 and apply VCC potential to pin 5 and pin 11, respectively.

To prevent an output current pulse tending to drive the motor in a clockwise direction and an output current pulse tending to drive the motor in a counter clockwise direction simultaneously, and to insure development of only a single output current pulse in response to a control signal, the reset lines of the monostable U1 are cross coupled. The output of U1, pin 10 is applied to Q12 through resistor R26 and the collector of Q12 is connected to pin 3 of U1. Pin 3 is the reset line for the other timer section of U1. Similarly the output of pin 6 of U1 is applied to the base of Q11 through R25 and the collector of Q11 is connected to pin 13 of U1 which is the reset line for the opposite timer section of U1. When a reset line is held low, it prevents an output pulse current from that particular timer section. Consequently with the cross coupling of the timer sections, the timer will only deliver a single pulse for a single actuation of its corresponding switch 61 or 62. Effectively the timer sections are toggled and only a single output current is produced despite repeated or continuous application of a control signal.

The transistors Q1–Q10 and the rectifier bridge CR1 provide bidirectional drive currents to the motor armature and field windings M1 and M2 for precisely controlled time periods. For clockwise rotation, FETs Q7 and Q10 receive a drive pulse of approximately 250 milliseconds from pin 10 of timer U1. FETs Q7 and Q10 are driven conductive and provide a low resistance path to ground. FET Q10, in turn, provides base drive for transistor Q5 through R3, which results in transistor Q5 turning on. The collector current of transistor Q5 provides base drive for transistor switch Q2, which together with switch Q3 controls the flow of motor current. FET Q7 provides base drive for switch transistor Q3 via resistor R1. Switch transistor Q3 in conjunction with Q2 controls the motor current for rotation in a clockwise direction.

In the counter clockwise direction, a drive pulse of approximately 250 milliseconds from pin 6 of timer U1 is applied to the gates of FETS Q8 and Q9. Q8 is thereby turned on and supplies base current for transistor Q6. Collector current of transistor Q6 drives switch transistor Q1 conductive, which is part of the current path for driving the motor in a counter clockwise direction. The drive pulse from pin 6 of timer U1 also is applied to the gate of FET Q9 which turns on and provides drive to switch transistor Q4 through R28 thereby turning on transistor Q4 which, along with Q1, controls the motor current in a counterclockwise direction.

As mentioned previously, both the armature and field windings of the motor are individually connected and the direction of the motor is determined by the relative direction of current through these windings. In the arbitrary example illustrated, current reversal in one of the windings makes the motor turn clockwise. When the current is in the same direction in both windings, the motor turns in a counter clockwise direction. The directional control is accomplished by connecting one of the windings M1 to the output terminals 82, 83 of rectifier bridge CR1. The current through that winding always flows in the same direction whether drive current is received from switch transistors Q1 and Q4 or from switch transistors Q2 and Q3. Winding M2, on the other hand is connected, in series with the input terminals 80, 81 of rectifier bridge CR1, between the output terminals 72, 73 of switching bridge 57 and current flow is reversed therein when the drive current is switched from transistors Q1, Q4 to transistors Q2, Q3. This was previously illustrated in FIG. 14. In the actual embodiment of the invention the motor is an AC motor that is operated with DC and the armature winding is connected to pins 1 and 4 of connector P2 and the field winding is connected to pins 2 and 3 of the connector.

With the inventive electronic control system, in response to an appropriate control signal, the bidirectional motor is energized via the double bridge arrangement in the selected direction. When operating a circuit breaker or the like, a predetermined current is supplied to the motor to cause it to run for a predetermined time. The predetermined time selected is longer than it takes to operate the circuit breaker and a clutch permits the motor to overrun.

What has been described is a novel electronic control system for a bidirectional motor. It is recognized that numerous modifications and changes in the described embodiment of the invention will be apparent to those skilled in the art without departing from its true spirit and scope. The invention is to be limited only as defined in the claims.

What is claimed is:

1. A bidirectional motor system comprising:
   a motor having separate armature and field windings;
   a first conductive bridge, including four transistor switches having base-emitter input circuits, having input terminals and output terminals;
   a source of voltage coupled across said input terminals of said first conductive bridge;
   a second conductive bridge including four diodes and having input terminals and output terminals;
   means connecting one of said armature and field windings in series with said input terminals of said second conductive bridge between said output terminals of said first conductive bridge;
   means connecting the other of said armature and said field windings between said output terminals of said second conductive bridge;
   control signal means for supplying a control signal;
   monostable timing means generating a fixed duration current output responsive to said control signal for simultaneously driving an oppositely oriented pair of said four transistor switches conductive to supply current to said second conductive bridge; and
   FET transistors driven conductive responsive to said control signal and coupled to the base-emitter input circuits of said transistor switches.

2. A bidirectional motor system comprising:
   a motor having separate armature and field windings;
   a switching bridge including four transistors and having input terminals and output terminals;
   a source of voltage coupled across said input terminals of said switching bridge;
   a rectifier bridge including four diodes having input terminals and output terminals;
   means connecting one of said armature and field windings in series with said input terminals of said rectifier bridge between said output terminals of said switching bridge;

means connecting the other of said armature and field windings between said output terminals of said rectifier bridge;

control signal means for supplying a control signal; and monostable timing means for generating a fixed duration current output responsive to said control signal for simultaneously driving an oppositely oriented pair of said four transistor switches conductive to supply current to said rectifier bridge.

3. A bidirectional motor control system comprising:

a bidirectional motor having separate armature and field windings;

a rectifier bridge connected in series with one of said armature and field windings;

a switching bridge including two pairs of transistor switches and having output terminals connecting the other of said armature and said field windings in series with said rectifier bridge;

dual monostable timer means for selectively supplying two predetermined duration output signals responsive to input signals of variable duration;

a pair of transistor driver means, selectively energized by said two predetermined duration output signals for driving said motor in different directions;

means responsive to said two predetermined duration output signals for selectively driving one of said two pairs of transistor switches in said switching bridge conductive; and means responsive to a received one of said two output signals for disabling the input to said dual monostable timer means associated with the other of said two output signals.

4. A bidirectional motor control system comprising:

a bidirectional motor having separate armature and field windings;

a rectifier bridge connected in series with one of said armature and field windings;

a switching bridge including two pairs of transistor switches and having output terminals connecting the other of said armature and said field windings in series with said rectifier bridge;

dual monostable timer means for selectively supplying two predetermined duration output signals in response to input signals of variable duration;

a pair of transistor driver means energized by respective ones of said two predetermined duration output signals for selectively driving one of said two pairs of transistor switches in said switching bridge conductive to operate said motor in one direction; and means responsive to a received one of said two output signals for disabling the input to said dual monostable timer means associated with the other of said two output signals.

* * * * *